United States Patent
Schwartz et al.

(10) Patent No.: US 8,934,504 B2
(45) Date of Patent: Jan. 13, 2015

(54) SYSTEM AND METHOD FOR FREQUENCY-AGILE TRANSMISSION IN A WIRELESS COMMUNICATION DEVICE

(75) Inventors: Daniel B. Schwartz, Scottsdale, AZ (US); David Harnishfeger, Chandler, AZ (US); Jeffrey D. Ganger, Chandler, AZ (US); George B. Norris, Gilbert, AZ (US); Bing Xu, Gilbert, AZ (US); Mark Alan Kirschenmann, Chandler, AZ (US); Claudio Rey, Tempe, AZ (US)

(73) Assignee: Intel IP Corporation, Santa Clara, CA (US)

( * ) Notice: Subject to any disclaimer, the term of this patent is extended or adjusted under 35 U.S.C. 154(b) by 479 days.

(21) Appl. No.: 13/208,698

(22) Filed: Aug. 12, 2011

(65) Prior Publication Data

US 2013/0039368 A1  Feb. 14, 2013

(51) Int. Cl.
| | |
|---|---|
| H04J 1/00 | (2006.01) |
| H04W 72/00 | (2009.01) |
| H04L 5/00 | (2006.01) |
| H04W 72/04 | (2009.01) |
| H04W 88/02 | (2009.01) |
| H04W 88/08 | (2009.01) |
| H04L 27/04 | (2006.01) |

(52) U.S. Cl.
CPC ............ *H04W 72/00* (2013.01); *H04L 5/0007* (2013.01); *H04L 5/003* (2013.01); *H04W 72/0453* (2013.01); *H04W 88/02* (2013.01); *H04W 88/08* (2013.01); *H04L 27/04* (2013.01)
USPC ........................................................ 370/480

(58) Field of Classification Search
None
See application file for complete search history.

(56) References Cited

U.S. PATENT DOCUMENTS

| | | | | |
|---|---|---|---|---|
| 2004/0203834 | A1* | 10/2004 | Mahany | 455/453 |
| 2011/0122974 | A1* | 5/2011 | Sundstrom et al. | 375/316 |
| 2011/0194510 | A1* | 8/2011 | Gaal et al. | 370/329 |
| 2012/0270537 | A1* | 10/2012 | Weng et al. | 455/424 |

* cited by examiner

*Primary Examiner* — Dang Ton
*Assistant Examiner* — Ronald h Davis
(74) *Attorney, Agent, or Firm* — Baker Botts L.L.P.

(57) ABSTRACT

In accordance with some embodiments of the present disclosure, a method may include determining a range of frequencies allocated to resource blocks to be transmitted during a subsequent sub-frame slot or sounding reference symbol sub-slot. The method may also include determining an approximate center frequency of the range of frequencies. The method may additionally include modulating resource blocks of the sub-frame or sounding reference symbol sub-slot at the approximate center frequency. The method may further include transmitting the modulated resource blocks at the approximate center frequency.

12 Claims, 5 Drawing Sheets

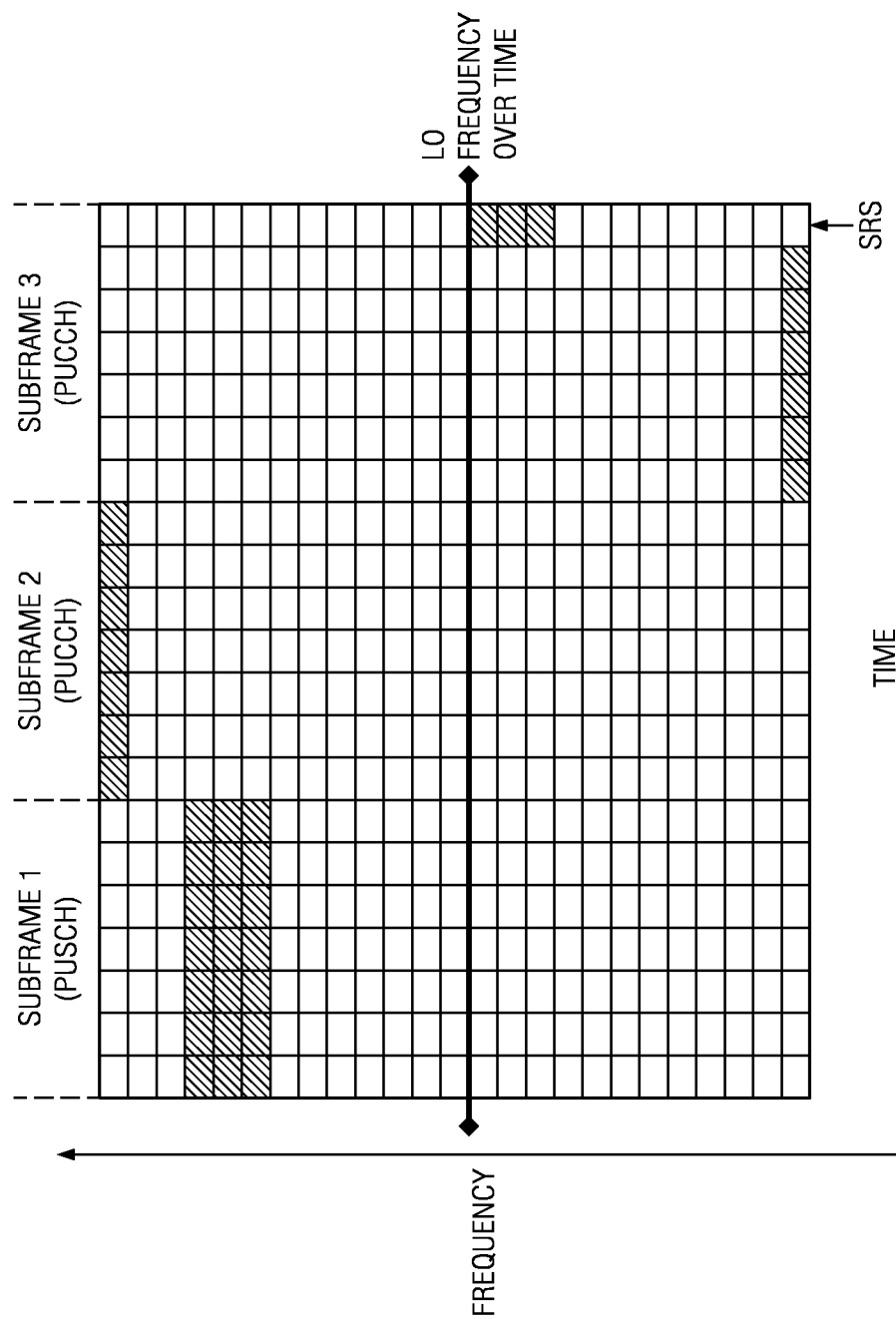

SYSTEM AND METHOD FOR FREQUENCY-AGILE TRANSMISSION IN A WIRELESS COMMUNICATION DEVICE

TECHNICAL FIELD

The present disclosure relates generally to wireless communication devices, and, more particularly, to transmission of signals in wireless communication devices.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include signal amplifiers which receive a radio-frequency or other signal, amplify the signal by a predetermined gain, and communicate the amplified signal. A receiver is an electronic device which receives and processes a wireless electromagnetic signal. A transmitter and receiver may be combined into a single device called a transceiver.

Transmitters, receivers, and transceivers often include components known as oscillators. An oscillator may serve many functions in a transmitter, receiver, and/or transceiver, including generating a local oscillator signal (usually in a radio-frequency range) for upconverting baseband signals onto a radio-frequency (RF) carrier and performing modulation for transmission of signals, and/or for downconverting RF signals to baseband signals and performing demodulation of received signals. Such oscillators may include components known as phase-locked loops (PLLs). A PLL may be a control system configured to generate an output signal whose phase is related to the phase of the input "reference" signal. A phase-locked loop circuit may compare the phase of the input signal with a phase signal derived from its output oscillator signal and adjusts the frequency of its oscillator to keep the phases matched.

Wireless communication devices are increasingly moving to the Long Term Evolution (LTE) standard or other standards based on orthogonal frequency-division multiplexing (OFDM) or single-carrier frequency-division multiple access (SC-FDMA) modulation. In order to achieve the high peak data rate and low latency mandated by multi-media applications of this system the bandwidth of the channel is generally far larger than legacy wireless systems. In order to allow efficient use of spectrum these systems frequently allocate small fractions of the total bandwidth to a user. The bandwidth and frequency range of this allocation can vary from subframe to subframe. The large bandwidth channels required for efficient use of mobile broadband protocols like LTE must be carved from increasingly crowded spectrum. As a result, numerous undesirable effects may occur, especially when a narrow band with allocation containing a single resource block at the edge of the channel is transmitted. For example, such undesirable effects may include, without limitation, receiver desensitivity due to transmitter baseband noise, spurious emissions and desensitivity due to intermodulation and other non-linear effects, and/or other problems.

SUMMARY

In accordance with some embodiments of the present disclosure, a method may include determining a range of frequencies allocated to resource blocks to be transmitted during a subsequent sub-frame slot or sounding reference symbol sub-slot. The method may also include determining an approximate center frequency of the range of frequencies. The method may additionally include modulating resource blocks of the sub-frame or sounding reference symbol sub-slot at the approximate center frequency. The method may further include transmitting the modulated resource blocks at the approximate center frequency and/or dynamically varying the bandwidth the analog baseband portion of the transmitter.

Technical advantages of one or more embodiments of the present disclosure may include systems and methods that may reduce or eliminate intermodulation and desensitives present in traditional approaches to wireless communication.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which:

FIG. 3A illustrates a graph of frequency versus time, showing an example allocation of resource blocks to particular frequencies during a transmission sub-frame of a wireless communication device in accordance with the SC-FDMA modulation format and depicting a local oscillator frequency over time for the wireless communication device, in accordance with the prior art;

DETAILED DESCRIPTION

Figure 1:
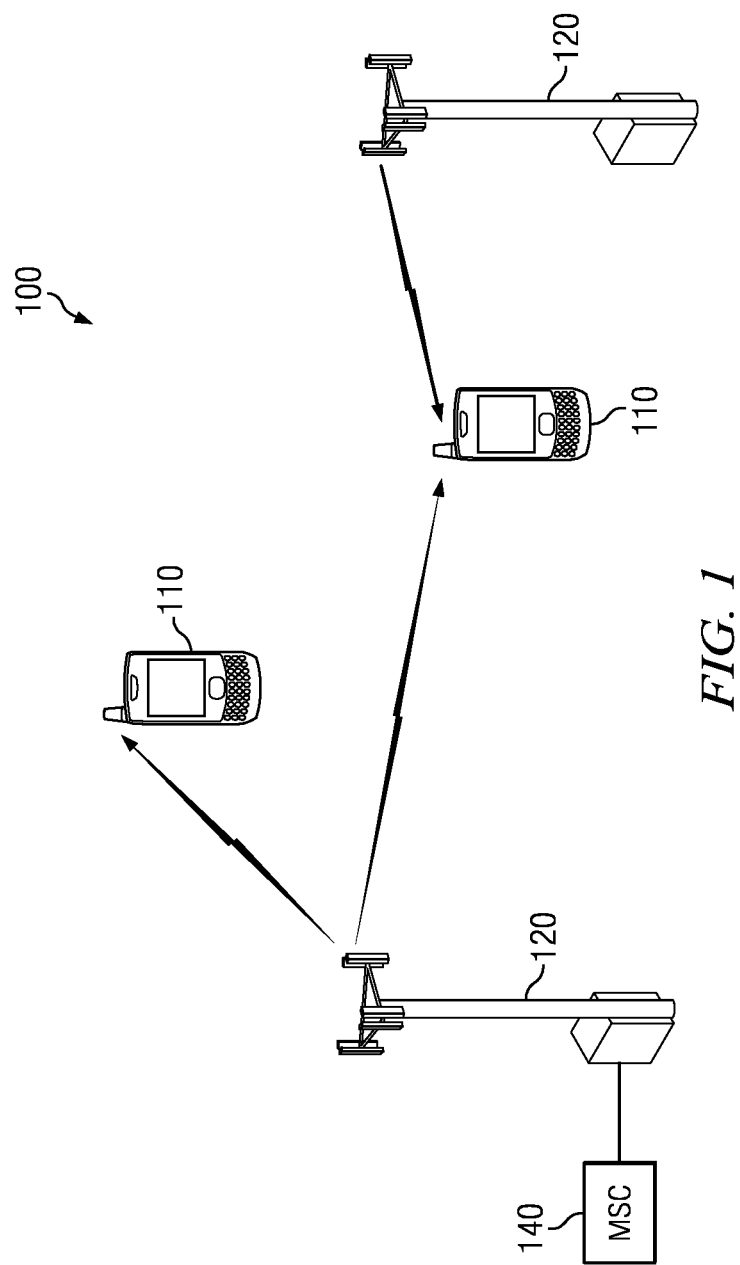
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. System 100 may be a Single Carrier Frequency Division Multiple Access (SC-FDMA) system, or some other wireless communication system. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology. A mobile switching center (MSC) 140 may be coupled to the base stations 120 and may provide coordination and control for base stations 120.

In FIG. 1, each terminal 110 is shown as receiving signals from multiple transmitting sources simultaneously, where a transmitting source may be a base station 120. In certain embodiments, a terminal 110 may also be a transmitting source. In general, a terminal 110 may receive signals from zero, one, or multiple transmitting sources at any given moment.

Figure 2:
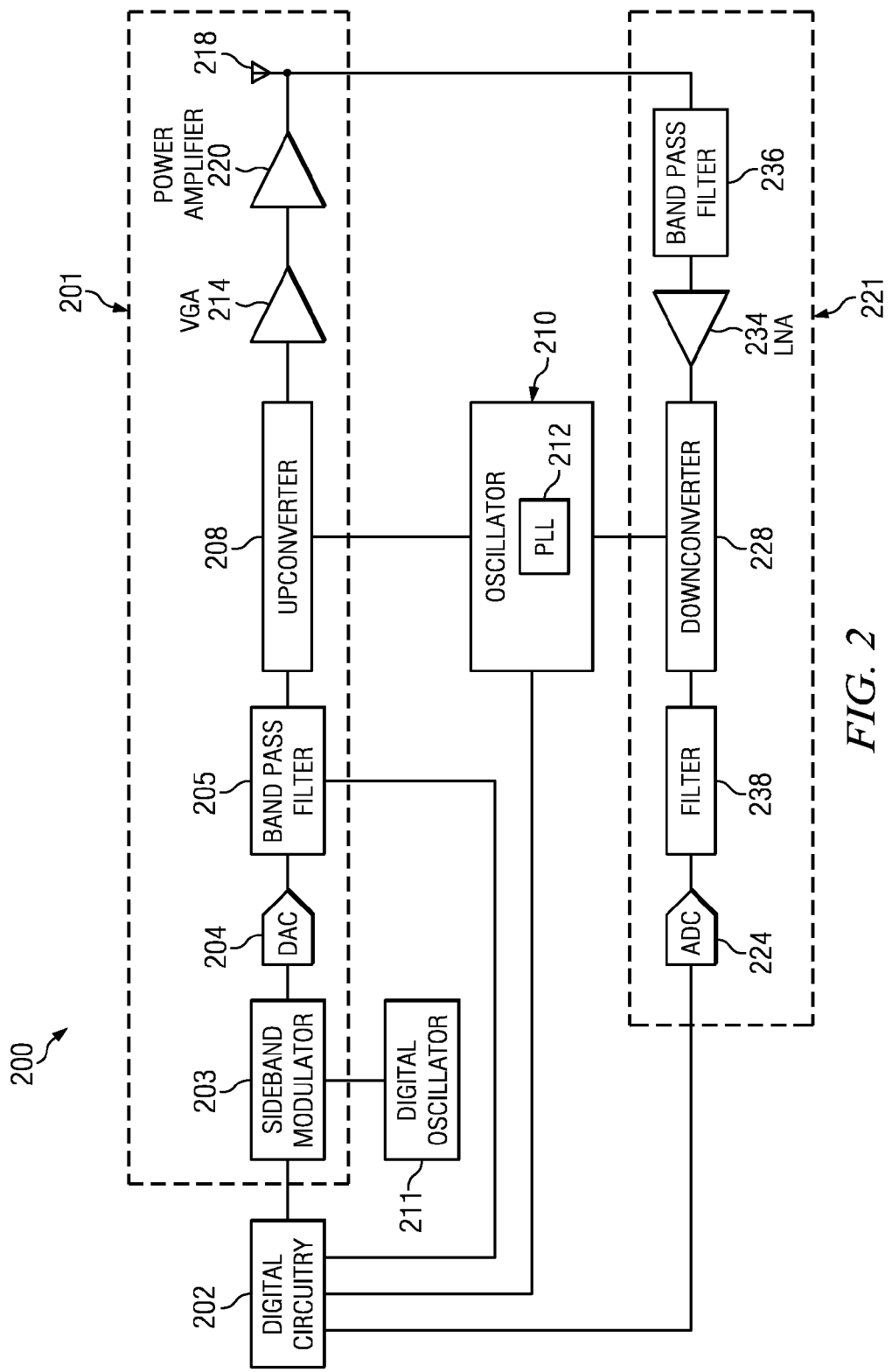
FIG. 2 illustrates a block diagram of selected components of an example transmitting and/or receiving element, in accordance with certain embodiments of the present disclosure.

FIG. 2 illustrates a block diagram of selected components of an example transmitting and/or receiving element 200 (e.g., a terminal 110 or a base station 120), in accordance with certain embodiments of the present disclosure. Element 200 may include a transmit path 201 and/or a receive path 221. Depending on the functionality of element 200, element 200 may be considered a transmitter, a receiver, or a transceiver.

As depicted in FIG. 2, element 200 may include digital circuitry 202. Digital circuitry 202 may include any system, device, or apparatus configured to process digital signals and information received via receive path 221, and/or configured to process signals and information for transmission via transmit path 201. Such digital circuitry 202 may include one or more microprocessors, digital signal processors, and/or other suitable devices.

Transmit path 201 may include a sideband modulator 203. Sideband modulator 203 may be configured to sideband modulate a digital signal output by digital circuitry 202 based on a digital oscillator signal provided by digital oscillator 211. Digital oscillator 211 may be any suitable device, system, or apparatus configured to produce signal at a particular frequency for modulation or upconversion of a digital signal to another digital signal.

Transmit path 201 may also include a digital-to-analog converter (DAC) 204. DAC 204 may be configured to receive a sideband modulated digital signal from sideband modulator 203 and convert such digital signal into an analog signal. Such analog signal may then be passed to one or more other components of transmit path 201, including baseband filter 205.

Baseband filter 205 may be configured to, based on a control signal received from digital circuitry 202, modify the bandwidth of an input analog signal to produce a filtered analog signal.

Upconverter 208 may be configured to frequency upconvert a filtered analog signal received from baseband filter 205 to a wireless communication signal at a radio frequency based on an oscillator signal provided by oscillator 210. Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal.

As shown in FIG. 2, oscillator may include a phase-locked loop (PLL) 212. PLL 212 may be a control system configured to generate a signal that has a fixed relation to the phase of a "reference" input signal by responding to both the frequency and the phase of the input signal, and automatically raising or lowering the frequency of a controlled oscillator until it is matched to the reference in both frequency and phase. As depicted in FIG. 2, oscillator 210 may be coupled to digital circuitry 202 such that digital circuitry may control oscillator 210 and/or PLL 212, as described in greater detail below.

Transmit path 201 may include a variable-gain amplifier (VGA) 214 to amplify an upconverted signal for transmission. The amplified filtered signal may be received by power amplifier 220 where it is amplified for transmission via antenna 218. Antenna 218 may receive the amplified and transmit such signal (e.g., to one or more of a terminal 110 and/or a base station 120).

Receive path 221 may include a bandpass filter 236 configured to receive a wireless communication signal (e.g., from a terminal 110, and/or a base station 120) via antenna 218. Bandpass filter 236 may pass signal components in the band of interest and remove out-of-band noise and undesired signals. In addition, receive path 221 may include a low-noise amplifier (LNA) 224 to amplify a signal received from bandpass filter 236.

Receive path 221 may also include a downconverter 228. Downconverter 228 may be configured to frequency downconvert a wireless communication signal received via antenna 218 and amplified by LNA 234 by an oscillator signal provided by oscillator 210 (e.g., downconvert to a baseband signal). Receive path 221 may further include a filter 238, which may be configured to filter a downconverted wireless communication signal in order to pass the signal components within a radio-frequency channel of interest and/or to remove noise and undesired signals that may be generated by the downconversion process. In addition, receive path 221 may include an analog-to-digital converter (ADC) 224 configured to receive an analog signal from filter 238 and convert such analog signal into a digital signal. Such digital signal may then be passed to digital circuitry 202 for processing.

Figure 3B:
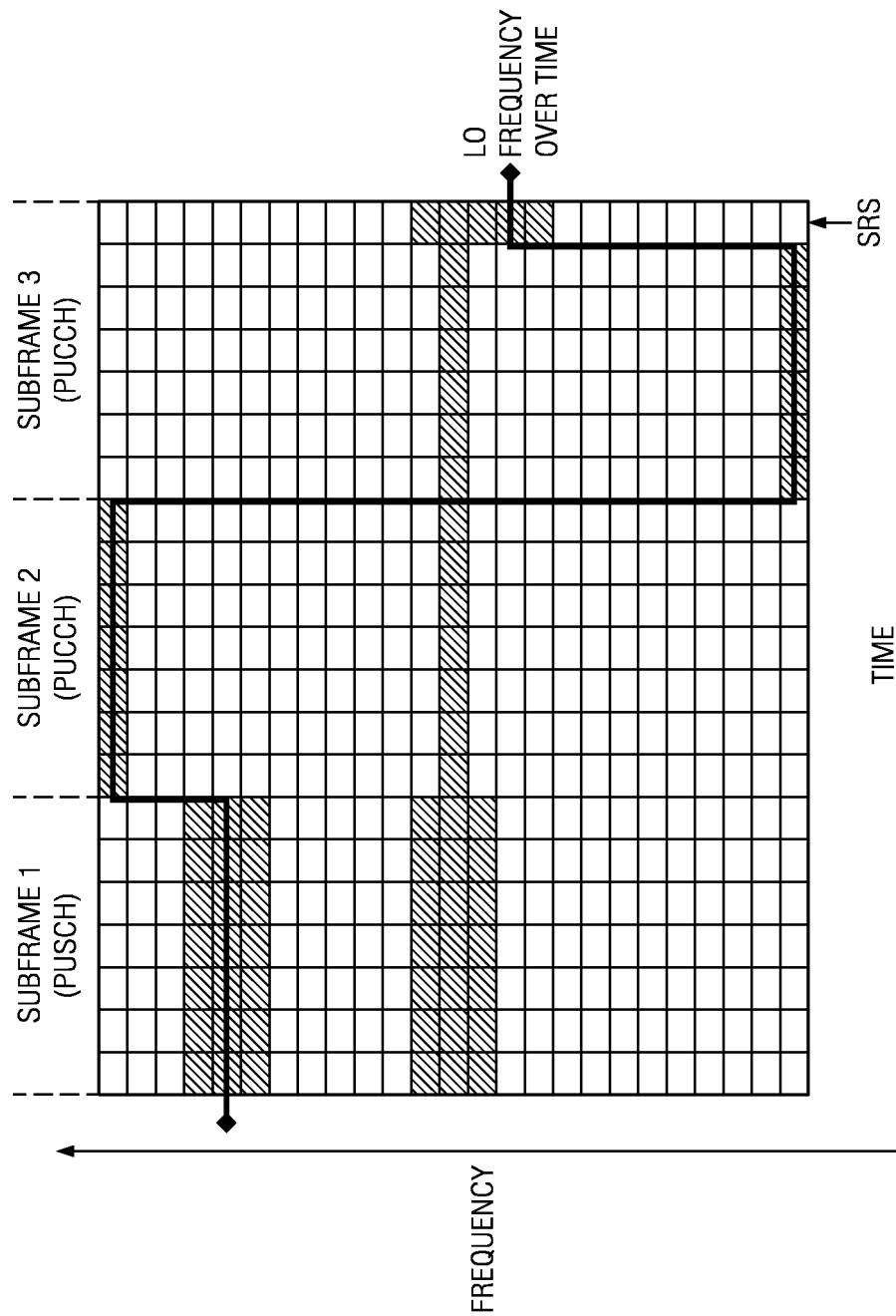
FIG. 3B illustrates a graph of frequency versus time, showing an example allocation of resource blocks to particular frequencies during a transmission sub-frame of a wireless communication device in accordance with the SC-FDMA modulation format and depicting a local oscillator frequency over time for the wireless communication device, in accordance with embodiments of the present disclosure.

In operation, digital circuitry 202 and/or another component of wireless communication device 200 may be configured to communicate a control signal to oscillator 210 and/or PLL 212 such that oscillator 210 generates and communicates to upconverter 208 a waveform having a frequency that is approximately centered within the range of frequencies of resource blocks actually transmitted during a sub-frame or a portion thereof. To illustrate, FIGS. 3A and 3B each depict a graph of frequency versus time, showing an example allocation of resource blocks to particular frequencies during a transmission sub-frame of wireless communication device 200 in accordance with the SC-FDMA modulation format. As is shown in FIGS. 3A and 3B, the SC-FDMA modulation format, amongst its other attributes, guarantees that only contiguous groups of frequencies are allocated to a wireless communication device at a given time. Also, as shown in FIG. 3, a SC-FDMA sub-frame may include a plurality (e.g., 3) slots including a data channel slot (PUSCH) and two control channel slots (PUCCH). The second control channel slot may include a sub-slot at the end of the second control channel slot for transmitting a sounding reference symbol (SRS). Accordingly, during a particular sub-frame, frequencies allocated to resource blocks may change multiple (e.g., 3) times. Specifically, FIG. 3A depicts the frequency/time plot of a signal as it appears both at DAC 204 and in the modulated RF output in traditional embodiments in which the frequency of oscillator 210 remains fixed over time.

However, in accordance with the present disclosure, digital circuitry 202 and/or another component of wireless communication device 200 may be configured to communicate a control signal to oscillator 210 and/or PLL 212 such that oscillator 210, at the beginning of each subframe, each slot boundary of a sub-frame, and prior to the SRS sub-slot, may modify the waveform it is communicating to upconverter 208, and generates and communicates to upconverter 208 a waveform having a frequency that is approximately centered within the range of frequencies of resource blocks actually transmitted during the successive slot or SRS sub-slot, as shown in FIG. 3B. FIG. 3B also depicts the signal at DAC 204 as a result of oscillator applying the approximate center frequency of each group of resource elements to upconverter 208.

In addition, in accordance with the present disclosure, digital circuitry 202 and/or another component of wireless communication device 200 may be configured to communicate a control signal to baseband filter 205 such that baseband filter 205, at the beginning of each subframe, each slot boundary of a sub-frame, and prior to the SRS sub-slot, may modify the bandwidth of the analog signal received by the baseband filter based at least on the approximate center frequency of each group of resource elements.

Further, in accordance with the present disclosure, digital circuitry 202 and/or another component of wireless communication device 200 may be configured to communicate a control signal to sideband modulator 203 indicative of an approximate delta frequency. The delta approximate frequency may be selected such that the baseband bandwidth of the signal applied by DAC 204 to the upconverter 208 is minimized or at least significantly reduced. Based on the control signal, sideband modulator 203 may sideband modulate the digital baseband signal output by digital circuitry 202. Sideband modulator 203 may take the complex baseband signal (including real and imaginary parts) generated by the digital components of transmit path 201 and may upconverts it to a real RF signal.

Figure 4:
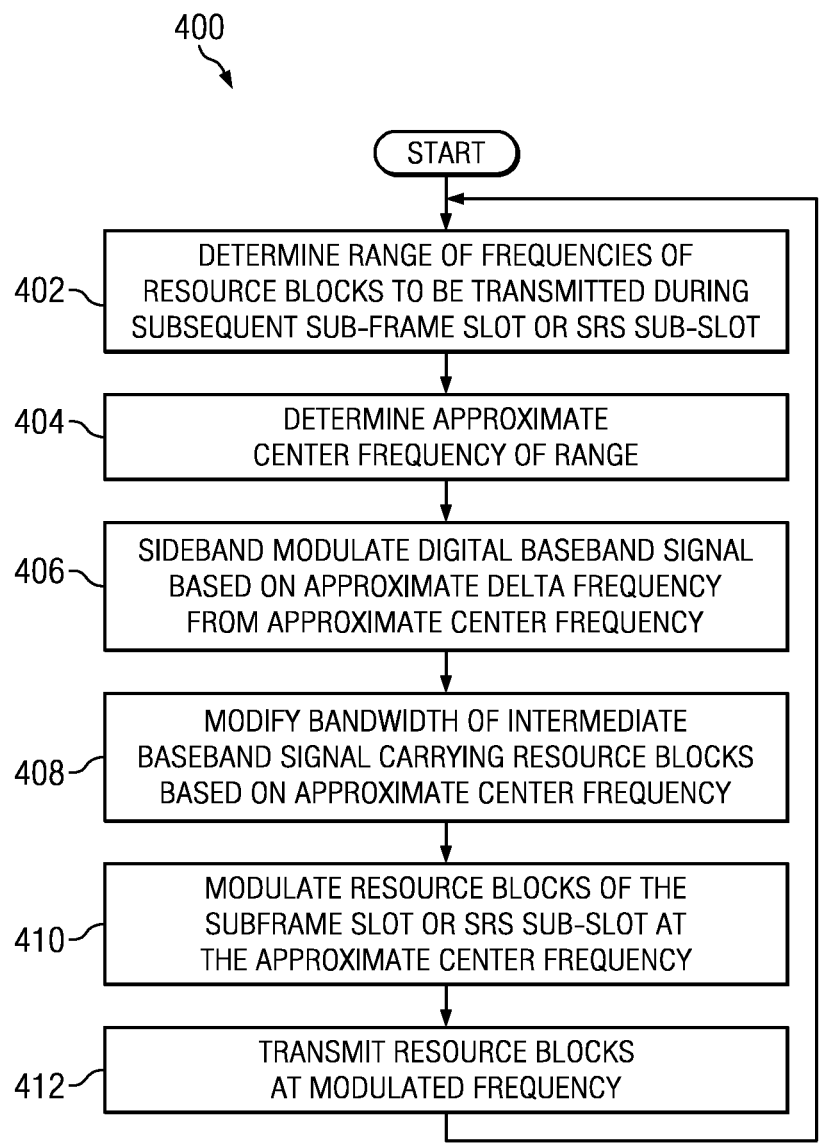
FIG. 4 illustrates a flow chart of an example method for establishing an oscillator output frequency, in accordance with embodiments of the present disclosure.

FIG. 4 illustrates a flow chart of an example method 400 for establishing an oscillator output frequency, in accordance with embodiments of the present disclosure. Method 400 may be performed by digital circuitry 202, oscillator 210, PLL 212, and/or one or more other components of wireless communication device 200. According to one embodiment, method 400 may begin at step 402. As noted above, teachings of the present disclosure may be implemented in a variety of configurations of wireless communication device 200. As such, the preferred initialization point for method 400 and the order of the steps 402-412 comprising method 400 may depend on the implementation chosen.

At step 402, digital circuitry and/or another component of a wireless communication device may determine a range of frequencies allocated to resource blocks to be transmitted during a subsequent sub-frame slot or SRS sub-slot. At step 404, the digital circuitry and/or other component of the wireless communication device may determine an approximate center frequency of the range of frequencies.

At step 408, a filter of a baseband portion of the transmit path of the wireless communication device may modify a bandwidth of an intermediate analog baseband signal carrying resource blocks of a sub-frame slot of SRS sub-slot based on the approximate center frequency. Accordingly, an amount of baseband noise upconverted by the upconverter (see step 408, below) may be minimized.

At step 410, a modulator of a transmit path of the wireless communication device may modulate resource blocks of the sub-frame slot or SRS sub-slot at the approximate center frequency. For example, digital circuitry of the wireless communication device may communicate a control signal to an oscillator and/or a PLL of the wireless communication device indicative of the approximate center frequency and, in response to receipt of the signal, the oscillator and/or the PLL may generate and communicate, to a modulator of a transmit path of the wireless communication device, a waveform at the approximate center frequency, thus enabling the modulator to modulate resource blocks at the approximate center frequency.

At step 412, the wireless communication device may transmit the resource blocks of the slot or sub-slot at the modulated frequency (e.g., via an antenna of the wireless communication device). After completion of step 410, method 400 may proceed again to step 402, where the loop of steps 402 to 410 may repeat for subsequent slots, SRS sub-slots, and/or sub-frames.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using wireless communication device 200 or any other system operable to implement method 400. In certain embodiments, method 400 may be implemented partially or fully in software and/or firmware embodied in computer-readable media.

A component of network wireless communication device 200 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to wireless communication device 200 from the scope of the disclosure. The components of wireless communication device 200 may be integrated or separated. Moreover, the operations of wireless communication device may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A wireless communication element, comprising:
   a transmit path configured to convert resource blocks in the form of a digital signal into a wireless communication signal based at least on an oscillator signal and transmit the wireless communication signal;
   control circuitry configured to:
      determine a first range of frequencies allocated to a first resource block to be transmitted during a first sub-frame slot;
      determine a first approximate center frequency based on the first range of frequencies;

determine a second range of frequencies allocated to a second resource block to be transmitted during a second sub-frame slot or sounding reference symbol (SRS) sub-slot; and determine a second approximate center frequency based on the second range of frequencies;

an oscillator configured to:

receive a control signal from the control circuitry, the control signal indicative of the first approximate center frequency during the first sub-frame slot and indicative of the second approximate center frequency during the second sub-frame slot or SRS sub-slot; and output the oscillator signal to the transmit path based at least on the control signal, such that the first resource block is modulated and transmitted by the transmit path at the first approximate center frequency, and the second resource block is modulated and transmitted by the transmit path at the second approximate center frequency; and a filter configured to:

receive a second control signal from the control circuitry, the second control signal indicative of the first approximate center frequency during the first sub-frame slot and indicative of the second approximate center frequency during the second sub-frame slot or SRS sub-slot; and modify an analog signal intermediate to the digital signal and the wireless communication signal in a baseband portion of the transmit path based at least on the second control signal;

wherein a center frequency of the filter corresponds to the first approximate center frequency during the first sub-frame slot and corresponds to the second approximate center frequency during the second sub-frame slot or SRS sub-slot.

2. A wireless communication element according to claim 1, the first sub-frame slot and the second sub-frame slot each comprising one of a data slot and a control slot of the sub-frame.

3. A wireless communication element according to claim 1, the sub-frame comprising a Single Carrier Frequency Division Multiple Access frame.

4. A wireless communication element according to claim 1, further comprising:

a digital oscillator configured to:

receive a second control signal indicative of an approximate delta frequency from the control circuitry; and output a digital oscillator signal; and a sideband modulator integral to the transmit path and configured to, based at least on the digital oscillator signal, sideband modulate the digital signal.

5. A method comprising:

determining a first range of frequencies allocated to a first resource block to be transmitted as a wireless communication signal during a first sub-frame slot;

determining a first approximate center frequency based on the first range of frequencies;

determining a second range of frequencies allocated to a second resource block to be transmitted during a second sub-frame slot or sounding reference symbol (SRS) sub-slot; and determining a second approximate center frequency based on the second range of frequencies;

modulating the first resource block at the first approximate center frequency;

transmitting the modulated first resource block at the first approximate center frequency;

modulating the second resource block at the second approximate center frequency; and transmitting the modulated second resource block at the second approximate center frequency;

modifying an intermediate analog signal to be converted to the wireless communication signal based at least on one of the first approximate center frequency and the second approximate center frequency;

wherein a center frequency of a filter modifying the intermediate analog signal corresponds to the first approximate center frequency during the first sub-frame slot and corresponds to the second approximate center frequency during the second sub-frame slot or SRS sub-slot.

6. A method according to claim 5, the first sub-frame slot and the second sub-frame slot each comprising one of a data slot and a control slot of the sub-frame.

7. A method according to claim 5, the sub-frame comprising a Single Carrier Frequency Division Multiple Access frame.

8. A method according to claim 5, further comprising sideband modulating a digital signal to be converted to the wireless communication signal based at least on an approximate delta frequency.

9. An article of manufacture, comprising:

a computer readable medium; and computer-executable instructions carried on the computer readable medium, the instructions readable by a processor of a wireless communication element, the instructions, when read and executed by the processer, for causing the wireless communication element to:

determine a first range of frequencies allocated to a first resource block to be transmitted during a first sub-frame slot;

determine a first approximate center frequency based on the first range of frequencies;

determine a second range of frequencies allocated to a second resource block to be transmitted during a second sub-frame slot or sounding reference symbol (SRS) sub-slot;

determining a second approximate center frequency based on the second range of frequencies;

modulate the first resource block at the first approximate center frequency;

transmit the modulated first resource block at the first approximate center frequency;

modulate the second resource block at the second approximate center frequency; and transmit the modulated second resource block at the second approximate center frequency;

modify an intermediate analog signal to be converted to the wireless communication signal based at least on one of the first approximate center frequency and the second approximate center frequency;

wherein a center frequency of a filter modifying the intermediate analog signal corresponds to the first approximate center frequency during the first sub-frame slot and corresponds to the second approximate center frequency during the second sub-frame slot or SRS sub-slot.

10. An article of manufacture according to claim 9, the first sub-frame slot and the second sub-frame slot each comprising one of a data slot and a control slot of the sub-frame.

11. An article of manufacture according to claim 9, the sub-frame comprising a Single Carrier Frequency Division Multiple Access frame.

12. An article of manufacture to claim 9, the wireless communication element further caused to sideband modulate a digital signal to be converted to the wireless communication signal based at least on an approximate delta frequency.

* * * * *